Nov. 24, 1931.  C. E. LIEDBERG  1,833,084
SANDING DEVICE FOR AUTOMOBILES
Filed Dec. 22, 1930
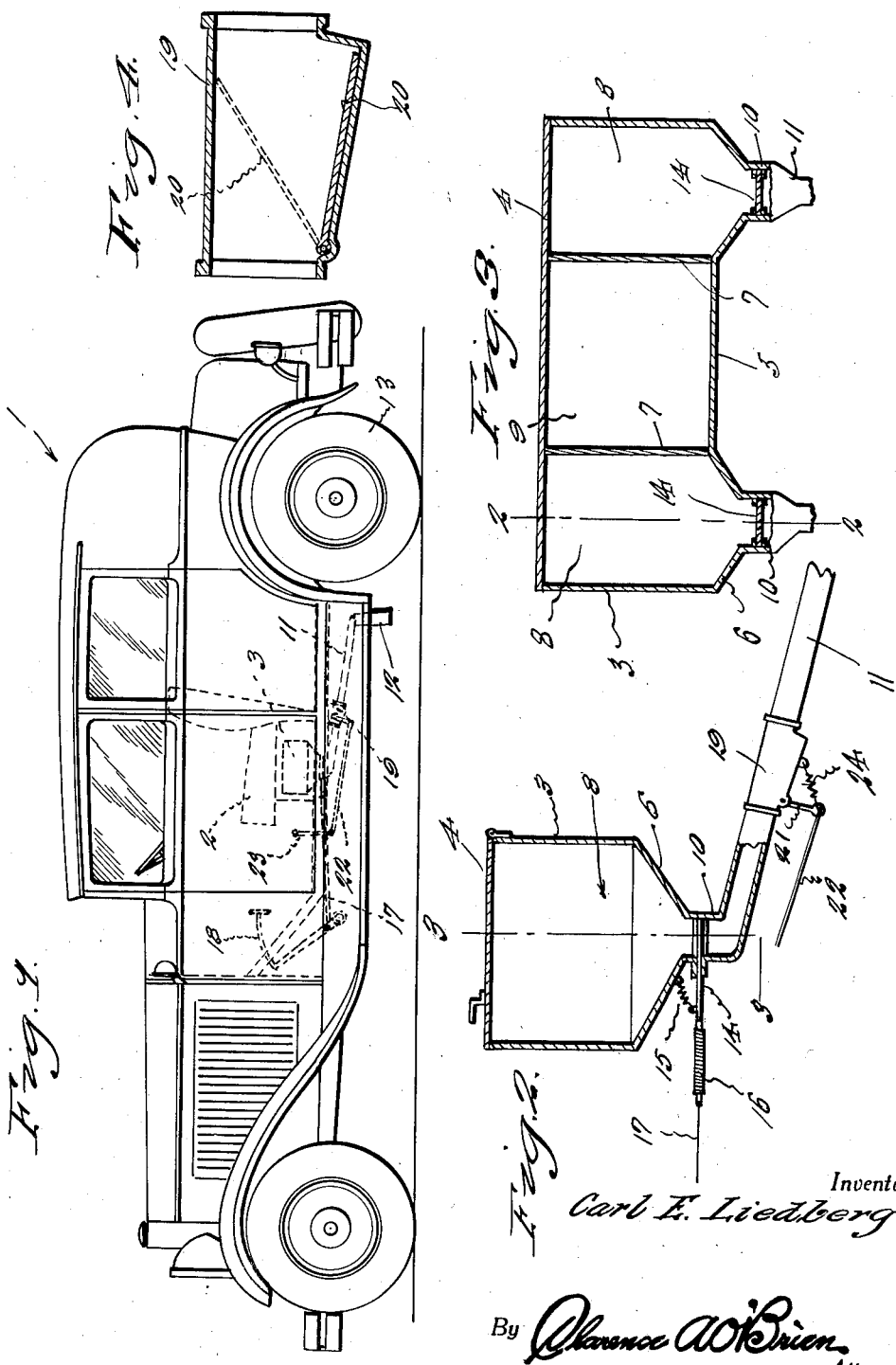
Inventor
Carl E. Liedberg
By Clarence A. O'Brien
Attorney Patented Nov. 24, 1931

1,833,084

UNITED STATES PATENT OFFICE

CARL EMIL LIEDBERG, OF CHICAGO, ILLINOIS

SANDING DEVICE FOR AUTOMOBILES

Application filed December 22, 1930. Serial No. 504,120.

The present invention relates to improvements in sanding devices for automobiles and has for one of its important objects to provide, in a manner as hereinafter set forth, a device of this character which includes a container adapted to be disposed beneath the driver's seat of an automobile or any other desired point and having therein partitions providing a pair of end compartments for the reception of sand and intermediate compartments which may constitute a tool box.

Other objects of the invention are to provide a sanding device for automobiles which will be simple in construction, strong, durable, efficient and reliable in use and which may be manufactured and installed at low cost.

All of the foregoing and still further objects and advantages of the invention may become apparent from a study of the following specification, taken in connection with the accompanying drawings wherein like characters of reference designate corresponding parts throughout the several views, and wherein:—

Figure 1 is a view in side elevation of an automobile equipped with a sanding device in accordance with this invention, said sanding device being shown principally in broken lines.

Figure 2 is a view principally in vertical longitudinal section taken substantially on the line 2—2 of Figure 3.

Figure 3 is a vertical transverse sectional view taken substantially on the line 3—3 of Figure 2.

Figure 4 is a view of one of the valves which is operatively associated with each of the sand dispensing pipes, the same being shown in vertical longitudinal sections.

Referring to the drawings in detail, it will be seen that the reference numeral 1 designates generally an automobile and 2 is the driver's seat. The sanding device comprises a container 3 which is adapted for disposition beneath the seat 2 of the automobile 1 and is of appropriate size and configuration.

It is understood, of course, that the container 1 may be disposed at any other desired place on the automobile. The top of the automobile is provided with a hinged closure 4. The bottom 5 of the container 3 is formed to provide hopper-shaped portions 6 and vertical partitions 7 are mounted in the container 3 adjacent each of the hopper-shaped portions 6 of the bottom 5 in a manner to provide sand receiving compartments 8 and an intermediate tool receiving compartment 9.

Discharge necks 10 communicate with the sand compartments 8 at the lower ends of said compartments and said necks 10 merge with the rearwardly inclined discharge pipes 11 having the down turned free end portions 12 disposed in front of the rear wheels 13 of the automobile 1.

Valves in the form of slidable plates 14 are provided in the necks 10 and are yieldingly retained in closed position by suitable springs 15 connected to the plates and with the container 3. Coil springs 16 and suitable wires or rods 17 operatively connect the slidable plates 14 with the brake pedal 18 of the automobile 1.

A valve casing 19 is interposed in each of the discharge pipes 11 and pivotally mounted therein is a swinging valve 20 having an operating arm 21 which is connected by a rod 22 to a hand lever 23 mounted in the automobile 1 forwardly of the driver's seat 2. The valve 20 is yieldingly retained in closed position by a spring 24.

In use the sand is placed in the compartments 8, and tools or any other desired articles may be placed in the intermediate compartment 9. When it is desired to discharge sand on the street or highway in the path of the rear wheels 13 of the automobile 1, the lever 23 is actuated to swing the valves 20 to open position as illustrated in full lines in Figure 4 of the drawings. Then, when the brakes of the automobile are applied by depressing the foot pedal 18 the slidable valves 14 are moved forwardly to open position against the tension of the coil springs 15 and the sand gravitates through the pipes 11 from the compartments 8 of the container 3 and is deposited by the down turned end portions 12 in front of the wheels 13. As will be apparent, the springs 16 provide a yieldable connection between the brake pedal 18 and the sliding valves 14. The valves 20 provide means for preventing the discharge of the sand every time the brake pedal 18 is depressed as it will be obvious that it will be desired to discharge the sand only under certain conditions.

It is believed that the many advantages of an automobile sanding device in accordance with this invention will be readily understood, and although the preferred embodiment of the invention is as illustrated and described, it is to be understood that changes in the details of construction may be had which will fall within the scope of the invention as claimed.

What is claimed is:—

1. A sanding device for automobiles comprising a container adapted to be mounted on the automobile and including a bottom having spaced hopper-shaped portions and a horizontal intermediate portion extending between the hopper-shaped portions, vertical partitions mounted in the container adjacent each of the hopper-shaped portions and providing an intermediate compartment for the reception of tools and a pair of outer compartments for the reception of the sand, and means for discharging the sand by gravity from the outer compartments in the path of certain of the wheels of the automobile.

2. A sanding device for automobiles comprising a container adapted to be mounted on the automobile and including a bottom having spaced hopper-shaped portions and a horizontal intermediate portion extending between the hopper-shaped portions, vertical partitions mounted in the container adjacent each of the hopper-shaped portions and providing an intermediate compartment for the reception of tools and a pair of outer compartments for the reception of the sand, and means for discharging the sand by gravity from the outer compartments in the path of certain of the wheels of the automobile, said means including necks communicating with the outer compartments at the lower ends of said compartments, rearwardly inclined discharge pipes connected with the lower ends of the necks, said discharge pipes being provided with down turned free end portions.

3. A sanding device for automobiles comprising a container adapted to be mounted on the automobile and including a bottom having spaced hopper-shaped portions and a horizontal intermediate portion extending between the hopper-shaped portions, vertical partitions mounted in the container adjacent each of the hopper-shaped portions and providing an intermediate compartment for the reception of tools and a pair of outer compartments for the reception of the sand, and means for discharging the sand by gravity from the outer compartments in the path of certain of the wheels of the automobile, said means including necks communicating with the outer compartments at the lower ends of said compartments, rearwardy inclined discharge pipes connected with the lower ends of the necks, said discharge pipes being provided with down turned free end portions, slidable valve plates operatively mounted in the necks for controlling the passage of the sand therethrough, resilient means operatively connecting the slidable valves to the brake pedals of the automobile, resilient means normally retaining the slidable valves in closed position, and pivoted valves interposed in the discharge pipes.

4. A sanding device for automobiles comprising a container having sand receiving compartments therein, discharge necks depending from the sand receiving compartments, discharge pipes extending rearwardly and downwardly from the lower ends of the necks, slidable valves mounted in the necks, springs yieldingly retaining the slidable valves in closed position, resilient means operatively connecting the slidable valves to the brake pedal of the automobile for actuation by said brake pedal, a pivoted valve interposed in each of the discharge pipes, operating arms operatively connected with the pivoted valves, springs operatively connected with the arms for yieldingly retaining the pivoted valves in closed position, a lever pivotally mounted on the automobile, and rods operatively connecting the arms to the lever for actuation by said lever.

In testimony whereof I affix my signature.

CARL EMIL LIEDBERG.